United States Patent
Marra et al.

(10) Patent No.: US 9,299,059 B1
(45) Date of Patent: Mar. 29, 2016

(54) GENERATING A SUMMARY OF SOCIAL MEDIA CONTENT

(75) Inventors: Gregory M. Marra, San Francisco, CA (US); Frances B. Haugen, Mountain View, CA (US)

(73) Assignee: Google Inc., Mountain View, CA (US)

( * ) Notice: Subject to any disclaimer, the term of this patent is extended or adjusted under 35 U.S.C. 154(b) by 336 days.

(21) Appl. No.: 13/490,789

(22) Filed: Jun. 7, 2012

(51) Int. Cl.
*G06F 15/16* (2006.01)
*G06Q 10/10* (2012.01)
*G06F 17/30* (2006.01)

(52) U.S. Cl.
CPC .......... *G06Q 10/10* (2013.01); *G06F 17/30864* (2013.01)

(58) Field of Classification Search
CPC .. H04L 67/22; G06F 17/30477; G06Q 50/01; G06Q 30/0256
USPC .......................................... 709/204; 707/722
See application file for complete search history.

(56) References Cited

U.S. PATENT DOCUMENTS

| | | | | |
|---|---|---|---|---|
| 6,539,232 | B2 * | 3/2003 | Hendrey | H04W 4/02 455/456.1 |
| 7,483,871 | B2 * | 1/2009 | Herz | |
| 8,055,673 | B2 * | 11/2011 | Churchill | G06F 17/30867 706/45 |
| 8,180,804 | B1 * | 5/2012 | Narayanan et al. | 707/798 |
| 8,504,567 | B2 * | 8/2013 | Billawala | G06F 17/30696 707/736 |
| 8,548,989 | B2 * | 10/2013 | Pickering et al. | 707/722 |
| 8,676,837 | B2 * | 3/2014 | Bharat et al. | 707/770 |
| 8,832,188 | B1 * | 9/2014 | Cierniak | 709/204 |
| 8,868,603 | B2 * | 10/2014 | Lee et al. | 707/771 |
| 2007/0067305 | A1 * | 3/2007 | Ives | G06F 17/30864 |
| 2007/0174389 | A1 * | 7/2007 | Armstrong et al. | 709/204 |
| 2008/0270119 | A1 * | 10/2008 | Suzuki | 704/9 |
| 2009/0083232 | A1 * | 3/2009 | Ives | G06F 17/3064 |
| 2009/0187516 | A1 * | 7/2009 | Kanungo et al. | 706/12 |
| 2009/0198667 | A1 * | 8/2009 | Groeneveld | G06F 17/30867 |
| 2009/0210381 | A1 * | 8/2009 | Singh | G06F 17/30696 |
| 2009/0307205 | A1 * | 12/2009 | Churchill et al. | 707/5 |
| 2010/0036934 | A1 * | 2/2010 | Bruster | G06F 17/30 709/219 |
| 2010/0131498 | A1 * | 5/2010 | Linthicum | G06F 19/322 707/722 |
| 2011/0106875 | A1 * | 5/2011 | Koenig | 709/203 |
| 2011/0106895 | A1 * | 5/2011 | Ventilla | G06Q 10/10 709/206 |
| 2011/0276560 | A1 * | 11/2011 | Costello | 707/708 |
| 2011/0320423 | A1 * | 12/2011 | Gemmell et al. | 707/706 |
| 2011/0320441 | A1 * | 12/2011 | Lee et al. | 707/723 |
| 2012/0005224 | A1 * | 1/2012 | Ahrens et al. | 707/769 |
| 2012/0016875 | A1 * | 1/2012 | Jin et al. | 707/734 |
| 2012/0030201 | A1 * | 2/2012 | Pickering | G06F 17/30675 707/728 |
| 2012/0066256 | A1 * | 3/2012 | Ramamurthi et al. | 707/771 |
| 2012/0102044 | A1 * | 4/2012 | Ott et al. | 707/748 |
| 2012/0166931 | A1 * | 6/2012 | Alonso et al. | 715/234 |
| 2012/0290605 | A1 * | 11/2012 | Ickman | G06F 17/30867 707/769 |
| 2013/0144868 | A1 * | 6/2013 | Ickman | G06Q 50/01 707/722 |

\* cited by examiner

*Primary Examiner* — Joseph E Avellino
*Assistant Examiner* — Binod J Kunwar
(74) *Attorney, Agent, or Firm* — Fish & Richardson P.C.

(57) ABSTRACT

A method includes receiving, using one or more processing devices, one or more search terms; searching, in a social network using the one or more processing devices, for items of social media content with at least a predefined amount of relevance to the one or more search terms; identifying, based on searching using the one or more processing devices, the items of social media content with at least the predefined amount of relevance to the one or more search terms; and generating, using the one or more processing devices, a summary of content in the identified items of social media content; wherein the summary comprises a subset of the content in the identified items of social media content.

22 Claims, 5 Drawing Sheets

GENERATING A SUMMARY OF SOCIAL MEDIA CONTENT

BACKGROUND

Social networks permit users to post information about themselves and to communicate with other people, e.g., their friends, family, and co-workers. Additionally, through the social network, users may post information about various events, including, e.g., traffic delays, accidents, flight information, concerts, conferences, fairs, fires, emergencies, and so forth. In this example, a user may search through posts in the social network for information about an event, e.g., to determine what other users of the social network have posted about the event.

SUMMARY

In one aspect of the present disclosure, a method includes receiving, using one or more processing devices, one or more search terms; searching, in a social network using the one or more processing devices, for items of social media content with at least a predefined amount of relevance to the one or more search terms; identifying, based on searching using the one or more processing devices, the items of social media content with at least the predefined amount of relevance to the one or more search terms; and generating, using the one or more processing devices, a summary of content in the identified items of social media content; wherein the summary comprises a subset of the content in the identified items of social media content.

Implementations of the disclosure can include one or more of the following features. In some implementations, generating the summary includes: identifying one or more terms that are occur with increased frequency in the items of social media content identified, relative to a frequency with which other terms occur in the items of social media content identified; wherein the summary includes at least one of the one or more terms identified. In other implementations, the method includes generating information that qualifies the one or more terms identified; wherein the summary further includes the information generated.

In still other implementations, generating the summary includes: identifying, in the items of social media content identified, an item of social media content authored by an authoritative source; wherein the summary includes at least the item of social media content authored by the authoritative source. In still other implementations, the method includes generating, based on the one or more search terms, a search query; wherein searching includes: searching based on the search query.

In some implementations, the method includes selecting one or more terms occurring in the items of social media content associated with at least the predefined amount of relevance to the one or more search terms; and expanding the search query to include the one or more terms selected. In still other implementations, the method includes identifying one or more terms occurring in the items of social media content associated with at least the predefined amount of relevance to the one or more search terms; identifying one or more previously executed search queries that include at least one of the one or more terms identified; and executing, with the search query generated, at least one of the one or more previously executed search queries; wherein identifying the items of social media content associated with at least the predefined amount of relevance to the one or more search terms includes: identifying based on executing. In other implementations, the method includes transmitting, to a client device, the summary for display in a content stream rendered in a graphical user interface.

In still another aspect of the disclosure, one or more machine-readable media are configured to store instructions that are executable by one or more processing devices to perform operations including receiving one or more search terms; searching, in a social network, for items of social media content with at least a predefined amount of relevance to the one or more search terms; identifying, based on searching, the items of social media content with at least the predefined amount of relevance to the one or more search terms; and generating a summary of content in the identified items of social media content; wherein the summary includes a subset of the content in the identified items of social media content. Implementations of this aspect of the present disclosure can include one or more of the foregoing features.

In still another aspect of the disclosure, an electronic system includes one or more processing devices; and one or more machine-readable media configured to store instructions that are executable by the one or more processing devices to perform operations including: receiving one or more search terms; searching, in a social network, for items of social media content with at least a predefined amount of relevance to the one or more search terms; identifying, based on searching, the items of social media content with at least the predefined amount of relevance to the one or more search terms; and generating a summary of content in the identified items of social media content; wherein the summary includes a subset of the content in the identified items of social media content. Implementations of this aspect of the present disclosure can include one or more of the foregoing features.

In yet another aspect of the disclosure, an electronic system includes means for receiving one or more search terms; means for searching, in a social network, for items of social media content with at least a predefined amount of relevance to the one or more search terms; means for identifying, based on searching, the items of social media content with at least the predefined amount of relevance to the one or more search terms; and means for generating a summary of content in the identified items of social media content; wherein the summary includes a subset of the content in the identified items of social media content. Implementations of this aspect of the present disclosure can include one or more of the foregoing features.

All or part of the foregoing can be implemented as a computer program product including instructions that are stored on one or more non-transitory machine-readable storage media, and that are executable on one or more processing devices. All or part of the foregoing can be implemented as an apparatus, method, or electronic system that can include one or more processing devices and memory to store executable instructions to implement the stated functions.

The details of one or more implementations are set forth in the accompanying drawings and the description below. Other features, objects, and advantages will be apparent from the description and drawings, and from the claims.

BRIEF DESCRIPTION OF DRAWINGS

Like reference symbols and designations in the various drawings indicate like elements.

DETAILED DESCRIPTION

Definitions

Figure 1:
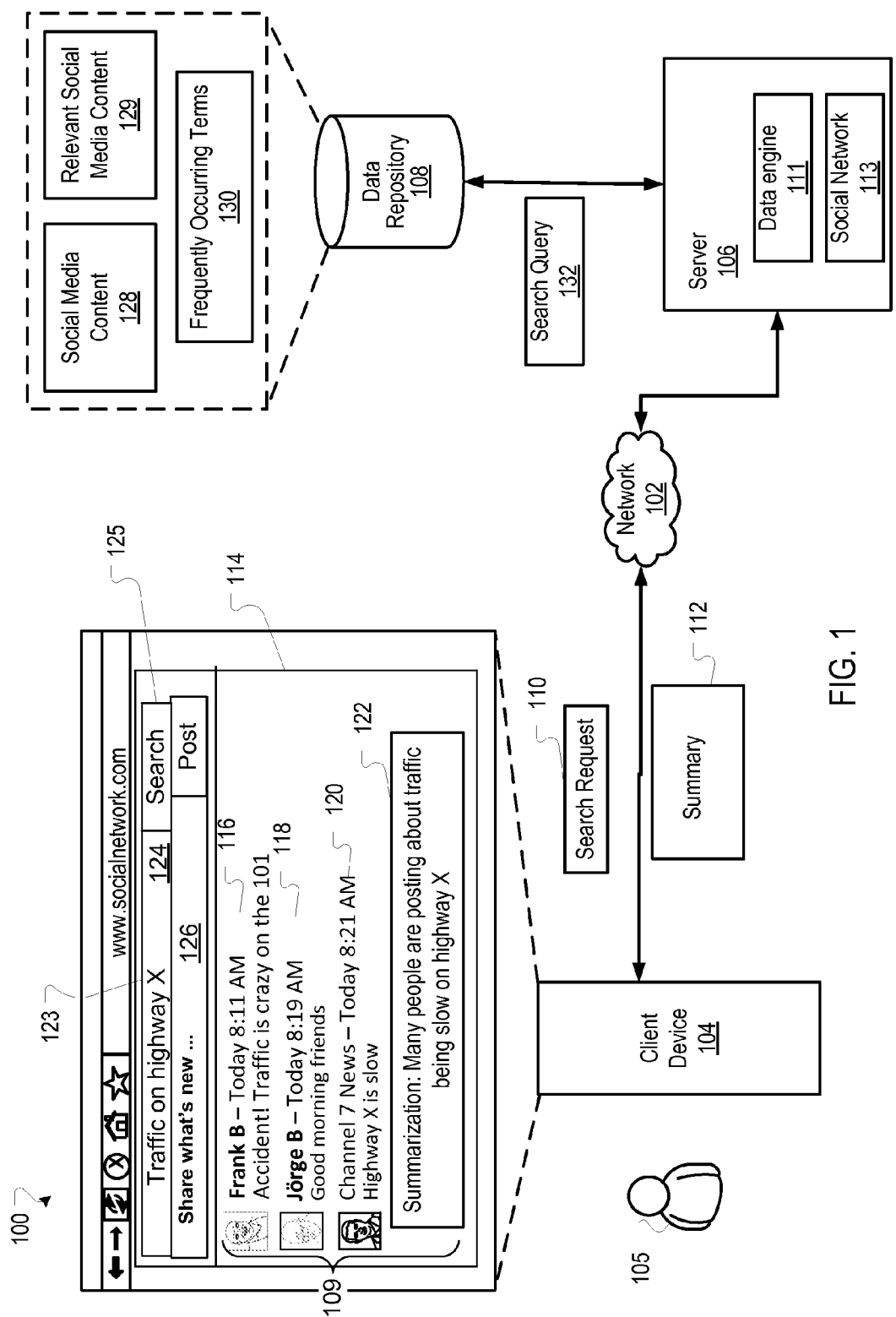
FIG. 1 is a diagram of an example of a network environment for generating a summary of social media content.

The term "social media content" as used herein encompasses its plain and ordinary meaning, including, but not limited to, electronic content that is submitted to a social network. Types of electronic content include posts, links, images, and so forth.

The term "content stream" as used herein encompasses its plain and ordinary meaning, including, but not limited to, items of social media content displayed in a portion of a graphical user interface designated for display of the items of social media content.

The term "social connection" as used herein encompasses its plain and ordinary meaning, including, but not limited to, a relationship between nodes in a graph representing users of a social networking service.

The term "relevance score" as used herein encompasses its plain and ordinary meaning, including, but not limited to, a measure of how closely an item of social media content matches search terms.

The term "threshold level of relevance" as used herein encompasses its plain and ordinary meaning, including, but not limited to, a predefined amount of relevance (e.g., a predefined relevance score).

The term "frequently occurring terms" as used herein encompasses its plain and ordinary meaning, including, but not limited to, terms that occur with increased frequency in relevant social media content, e.g., relative to a frequency with which other terms occur in the relevant social media content.

The term "term frequency ('TF') metric" as used herein encompasses its plain and ordinary meaning, including, but not limited to, a metric specifying a number of times a particular term is included in a resource (e.g., an item of social media content).

The term "term frequency-inverse document frequency ('TF-IDF') metric" as used herein encompasses its plain and ordinary meaning, including, but not limited to, a metric specifying an importance of a term to a resource in a collection of resources. For example, the importance of a term to a resource increases proportionally to the number of times the term appears in the resource but is offset by the frequency of the term in the collection of resources.

The term "resource" as used herein encompasses its plain and ordinary meaning, including, but not limited to, item(s) of data that can be provided over a network. Resources include content streams, items of social media content, HTML pages, word processing documents, portable document format (PDF) documents, images, video, applications, feed sources, and so forth.

The term "authoritative source" as used herein encompasses its plain and ordinary meaning, including, but not limited to, an entity with knowledge or experience in a field and/or an entity that is relied upon by individuals for information.

The term "processing device" as used herein encompasses its plain and ordinary meaning, including, but not limited to, a processor and/or logic that is capable of receiving and storing data, and of communicating over a network.

The term "summary" as used herein encompasses its plain and ordinary meaning, including, but not limited to, an encapsulation of content from multiple items of content. For example, the summary may be a single or a few phrases that provide an encapsulation of multiple posts, while not containing the full text of any of the posts. In another example, the summary includes a subset of the content included in multiple items of content.

Overview

A system consistent with this disclosure uses social media content in generating a response to a search query. In an example, a user submits a request, to the system, for social media content that is relevant to search terms in a search query. The system identifies social media content that is relevant to the search terms. The system also generates a summary of the social media content identified and transmits the summary, to the user, as a response to the search query.

In an example, a user submits search terms to the system. The search terms are indicative of a name of a highway. In this example, the system identifies resources that are relevant to the name of the highway. Many of the resources identified are items of social media content (e.g., posts). Using the contents of the posts, the system generates a summary of the posts.

In this example, posts are about an accident occurring on the highway for which the search was submitted. In this example, the summary includes a statement describing the accident and describing what users of the system are posting about the accident. In this example, the user that submitted the search can review the summary, e.g., rather than reviewing all of the individual posts related to the accident. Based on review of the summary, the user can quickly read what other users are saying about the highway identified by the search terms.

Example Network Environments

FIG. 1 is a diagram of an example of a network environment 100 for generating a summary of social media content. Network environment 100 includes client device 104, server 106, data repository 108, and network 102. Client device 104 can communicate with server 106 over network 102. Network environment 100 may include many thousands of client devices and servers, which are not shown.

In the example of FIG. 1, server 106 hosts social network 113. Server 106 also includes data engine 111 for generating summary 112 of social media content 128 (or portions thereof) submitted to social network 113. Although data engine 111 is shown as a single component in FIG. 1, data engine 111 can exist in one or more components, which can be distributed and coupled by network 102. In an example, social network 113 and data engine 111 may be combined into a single component.

Network environment 100 also includes member 105 of social network 113. In this example, member 105 is also a user of client device 104. Member 105 can participate in social network 113 by uploading and downloading social media content 128 (or portions thereof) to social network 113. Other members (not shown) interacting with other client devices (not shown) can also participate in social network 113 by uploading and downloading social media content 128 (or portions thereof) to social network 113. In an example, server 106 stores, in data repository 108, social media content 128 that has been uploaded to social network 113.

In an example, server 106 generates data for graphical user interface 114. When rendered by client device 104, graphical user interface 114 includes a main page for member 105 of social network 113. Graphical user interface 114 can display portions of social media content 128 that has been shared with member 105.

In the example of FIG. 1, graphical user interface 114 includes content stream 109 for display of items 116, 118, 120 of social media content 128. In the example of FIG. 1, items 116, 118, 120 of social media content 128 include posts that have been made by members of social network 113 and that are socially connected to member 105.

In an example, items 116, 120 include information pertaining to traffic caused by an accident on a highway that is named highway X. Item 118 includes information unrelated to the accident. Although three items of social media content are depicted in FIG. 1, it is appreciated that content stream 109 can display more than three items of social media content to member 105.

In the example of FIG. 1, graphical user interface 114 also includes content sharing interface 126. Member 105 can activate (e.g., click on) content sharing interface 126 to input electronic content. Graphical user interface 114 also includes search field 124 for the input of search terms 123 to be used in searching social network 113 for content. Graphical user interface 114 includes search function 125, which may be selected to send search request 110 to server 106 to search for content related to search terms 123 input into search field 124.

In the example of FIG. 1, member 105 inputs search terms 123 into search field 124. In this example, search terms 123 include the words "traffic on highway X." In this example, items 116, 120 of social media content 128 are related to search terms 123. As described in further detail below, social media content 128 includes additional information that is related to search terms 123 and that may be used in generating a response to search request 110.

Following entry of search terms 123 into search field 124, member 105 selects search function 125. Selection of search function 125 causes client device 104 to generate search request 110. Search request 110 includes a request for portions of social media content 128 that are relevant to search terms 123. Search request 110 also includes information about member 105, including, e.g., username information. Client device 104 transmits search request 110 to server 106.

In response, server 106 generates search query 132. Using search query 132, data engine 111 searches data repository 108 for portions of social media content 128 that are relevant to search terms 123 and that are related to member 105 (e.g., portions of social media content 128 that are accessible to member 105). For example, the search may identify portions of social media content 128 that include search terms 123 and to which member 105 has some social connection (e.g., the content may be by an author to whom member 105 is socially connected). Server 106 may determine relevance scores for items of social media content identified in the search.

From items of social media content 128 identified in the search, data engine 111 selects relevant social media content 129. In this example of FIG. 1, relevant social media content 129 includes portions of social media content 128 with relevance scores above a threshold level of relevance.

Items of relevant social media content 129 may be selected for output to member 105, e.g., by being displayed in a portion of graphical user interface 114. In this example, the response to search request 110 includes the output items of relevant social media content 129.

The selected items of relevant social media content 129 content may be ranked prior to output. Ranking may be performed based, e.g., on information that is member-specific and/or on information that is not member-specific. For example, items of relevant social media content 129 to which member 105 has a social connection may be ranked as having more relevance than items of social media content to which member 105 does not have a social connection. In another example, items of relevant social media content 129 may be ranked based on their system-wide popularity regardless of whether member 105 has a social connection to the author of the corresponding content.

In the example of FIG. 1, data engine 111 also generates summary 112 of relevant social media content 129. In an example, summary 112 includes a synopsis of relevant social media content 129. Using summary 112, member 105 may quickly review information that is relevant to search terms 123, e.g., rather than reviewing the individual items of relevant social media content 129 that may be returned in response to search request 110. In this example, summary 112 includes a response to search request 110 and is displayed in graphical user interface 114 as visual representation 122.

In an example, data engine 111 identifies frequently occurring terms 130 in relevant social media content 129 in generating summary 112. In this example, data engine 111 extracts, from items of relevant social media content 129, frequently occurring terms 130.

In this example, data engine 111 identifies frequently occurring terms based on various metrics, including, e.g., TF metrics and TF-IDF metrics. In an example, data engine 111 generates TF-IDF metrics for the terms included in the items of relevant social media content 129. Data engine 111 selects terms with TF-IDF metrics that are above a threshold level. Using the selected terms, data engine 111 generates summary 112 of relevant social media content 129. In an example, data engine 111 generates summary 112 by concatenating together the selected terms.

In another example, data engine 111 selects items of relevant social media content 129 that are authored by an authoritative source, including, e.g., a famous person, a news source, and so forth. In this example, data repository 108 is configured to store information indicative of famous people, news sources, and so forth. Using the stored information, data engine 111 is configured to identify items of relevant social media content 129 that has been authored by a famous person and/or by a news source. In an example, an item (not shown) of relevant social media content 129 that has been authored by a news source may include the following post: "Channel 3 news reports three car pile up at Millbrae exit on highway X. News at 11"

In this example, relevant social media content 129 authored by the authoritative source may include terms with TF-IDF metrics above the threshold level. In another example, relevant social media content 129 authored by the authoritative source may include terms with TF-IDF metrics below the threshold level. In this example, summary 112 includes items of relevant social media content 129 authorized by the authoritative source and terms with TF-IDF metrics about the threshold level and/or any combination thereof.

In an example, summary 112 includes items of relevant social media content 129 authored by the authoritative source. Summary 112 also includes a concatenation of terms from relevant social media content 129 with TF-IDF metrics about the threshold level.

In still another example, summary 112 includes information that qualifies the terms with TF-IDF metrics above the threshold level. For example, summary 112 may include the following qualification language: "Many people are posting about." In this example, data engine 111 is configured to insert, after the qualification language, a concatenation of the terms with TF-IDF scores above the threshold level. In the example of FIG. 1, the concatenation of terms includes the following terms: "traffic being slow on highway 101."

In an example, data engine 111 is configured to expand search terms 123 with terms in relevant social media content 129. For example, relevant social media content 129 includes item 116 of social media content 128. Item 116 of social media content 128 includes the term "accident." In this example, data engine 111 includes the term "accident" in search query 132 that includes search terms 123. By expanding search terms 123 to include the term accident, data engine 111 may be able to identify additional items of social media content 128 that are relevant to search request 110 of member 105.

In still another example, data engine 111 includes in search query 132 information indicative of a geographic location of client device 104. For example, there may be hundreds of highways named "highway X" in the United States. In this example, member 105 is likely to be interested in highway X that is close to a geographic location of member 105. In this example, when member 105 selects search function 125, client device 104 obtains information indicative of a geographic location of client device 104. Client device 104 includes the information indicative of the geographic location in search request 110. Using the information indicative of geographic location, data engine 111 identifies portions of social media content 128 that are relevant to search term 123 and to the geographic location of client device 104.

In still another example, data engine 111 is configured to use frequently occurring terms 130 in identifying other queries that are related to search query 132. In this example, data repository 108 stores information indicative of search queries that have been performed by data engine 111 over a predefined period of time (e.g., in the last day, in the last week, in the last month, and so forth). Data engine 111 identifies, in the stored search queries, search queries that include a number of frequently occurring terms 130. Data engine 111 re-executes these identified search queries, e.g., to determine if execution of the identified search queries results in additional items of social media content 128 that may be relevant to search query 132.

In another example, data engine 111 selects, from relevant social media content 129, posts to be used in generating summary 112. Data engine 111 selects the posts by matching terms in multiple posts (e.g., posts in relevant social media content 129), determining a sentiment (or other analysis) about the posts, and generating summary 112 based on the sentiment analysis. Generally, a sentiment includes information indicative of an emotion. In an example, data engine 111 is configured to identify sentiments based on accessing a mapping of various emotions to various keywords.

In this example, multiple posts (e.g., item 120) include information indicative of the slowness of highway X and multiple posts (e.g., item 116) include information indicative of an accident on highway X, then summary 112 could include the following information: "There may be an accident on highway X and many people are talking about how slow it is."

In still another example, data engine 111 identifies numerous sentiments (e.g., dual sentiments). In this example, summary 112 reflects the numerous sentiments. For example, data engine 111 identifies a number of posts about a new movie. Thirty percent of the posts are favorable. Thirty percent of the posts are unfavorable. The remaining posts are determined to be neither favorable nor unfavorable. In this example, data engine 111 generates summary 112 with information indicating that a lot of people are posting about the new movie, with mixed reviews.

Example System Implementations

Figure 2:
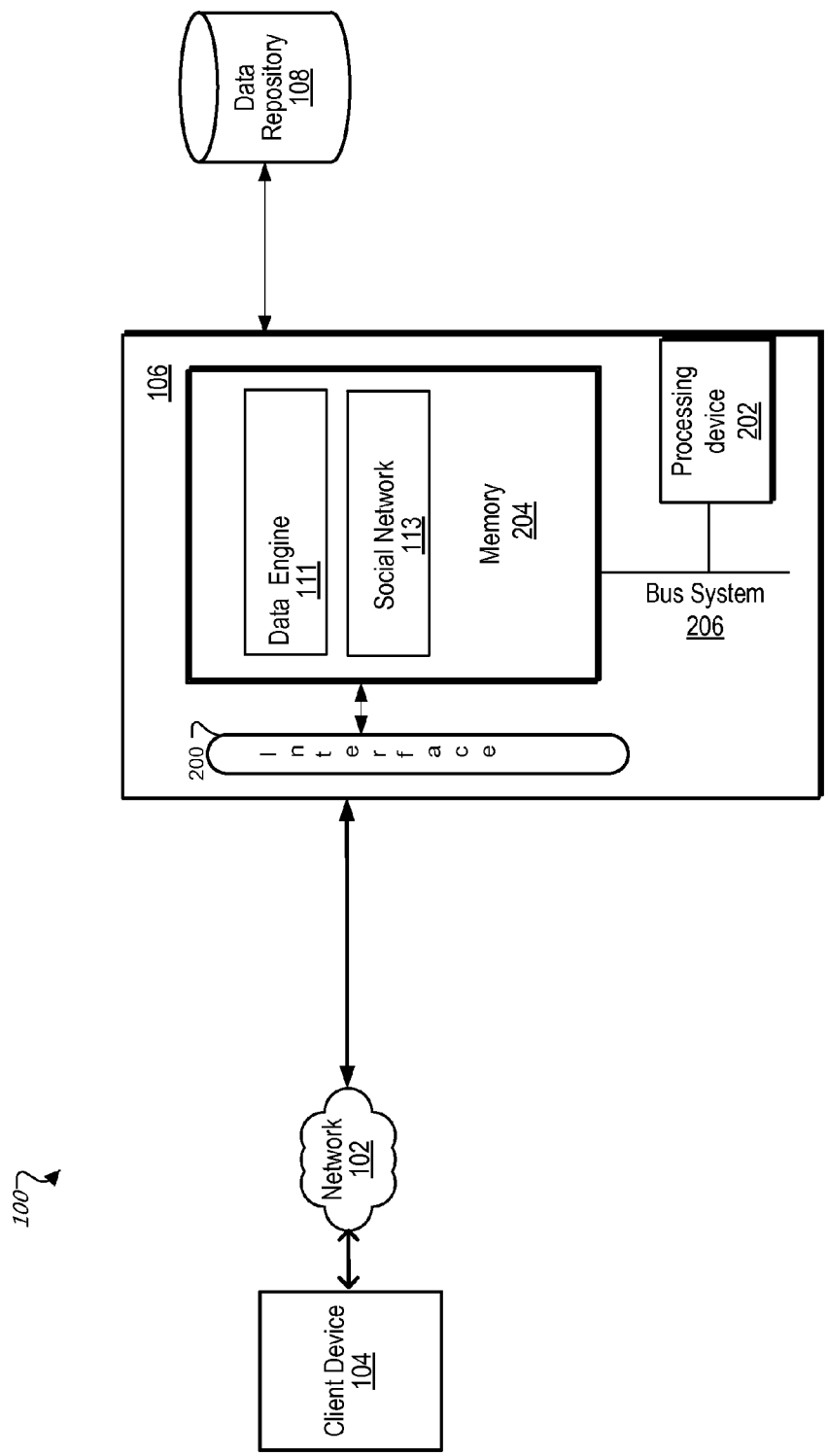
FIG. 2 is a block diagram showing examples of components of a network environment for generating a summary of social media content.

FIG. 2 is a block diagram showing examples of components of network environment 100 for generating summary 112 of social media content 128. In the example of FIG. 2, graphical user interface 114, contents of graphical user interface 114, contents of data repository 108, search request 110, summary 112, search query 132, and member 105 are not shown.

Client device 104 can be a computing device capable of taking input from a user and communicating over network 102 with server 106 and/or with other computing devices. For example, client device 104 can be a mobile device, a desktop computer, a laptop, a cell phone, a personal digital assistant (PDA), a server, a television with one or more processors embedded therein and/or coupled thereto, an embedded computing system, and the like. Network environment 100 can include a plurality of computing devices, which can be geographically dispersed.

Network 102 can include a large computer network, including, e.g., a local area network (LAN), wide area network (WAN), the Internet, a cellular network, or a combination thereof connecting a number of mobile computing devices, fixed computing devices, and server systems. The network(s) may provide for communications under various modes or protocols, including, e.g., Transmission Control Protocol/Internet Protocol (TCP/IP), Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. Communication may occur through a radio-frequency transceiver. In addition, short-range communication may occur, including, e.g., using a Bluetooth®, WiFi, or other such transceiver.

Server 106 can be a variety of computing devices capable of receiving data and running one or more services, which can be accessed by client device 104. In an example, server 106 can include a server, a distributed computing system, a desktop computer, a laptop, a cell phone, a rack-mounted server, and the like. Server 106 can be a single server or a group of servers that are at a same location or at different locations. Client device 104 and server 106 can run programs having a client-server relationship to each other. Although distinct modules are shown in the figures, in some examples, client and server programs can run on the same device.

Server 106 can receive data from client device 104 through input/output (I/O) interface 200. I/O interface 200 can be a type of interface capable of receiving data over a network, including, e.g., an Ethernet interface, a wireless networking interface, a fiber-optic networking interface, a modem, and the like. Server 106 also includes a processing device 202 and memory 204. A bus system 206, including, for example, a data bus and a motherboard, can be used to establish and to control data communication between the components of server 106.

Processing device 202 can include one or more microprocessors. Memory 204 can include a hard drive and a random access memory storage device, including, e.g., a dynamic random access memory, or other types of non-transitory machine-readable storage devices. As shown in FIG. 2, memory 204 stores computer programs that are executable by processing device 202. These computer programs include data engine 111 and social network 113. Data engine 111 and social network 113 can be implemented in software running on a computer device (e.g., server 106), hardware or a combination of software and hardware.

Example Processes

Figure 3:
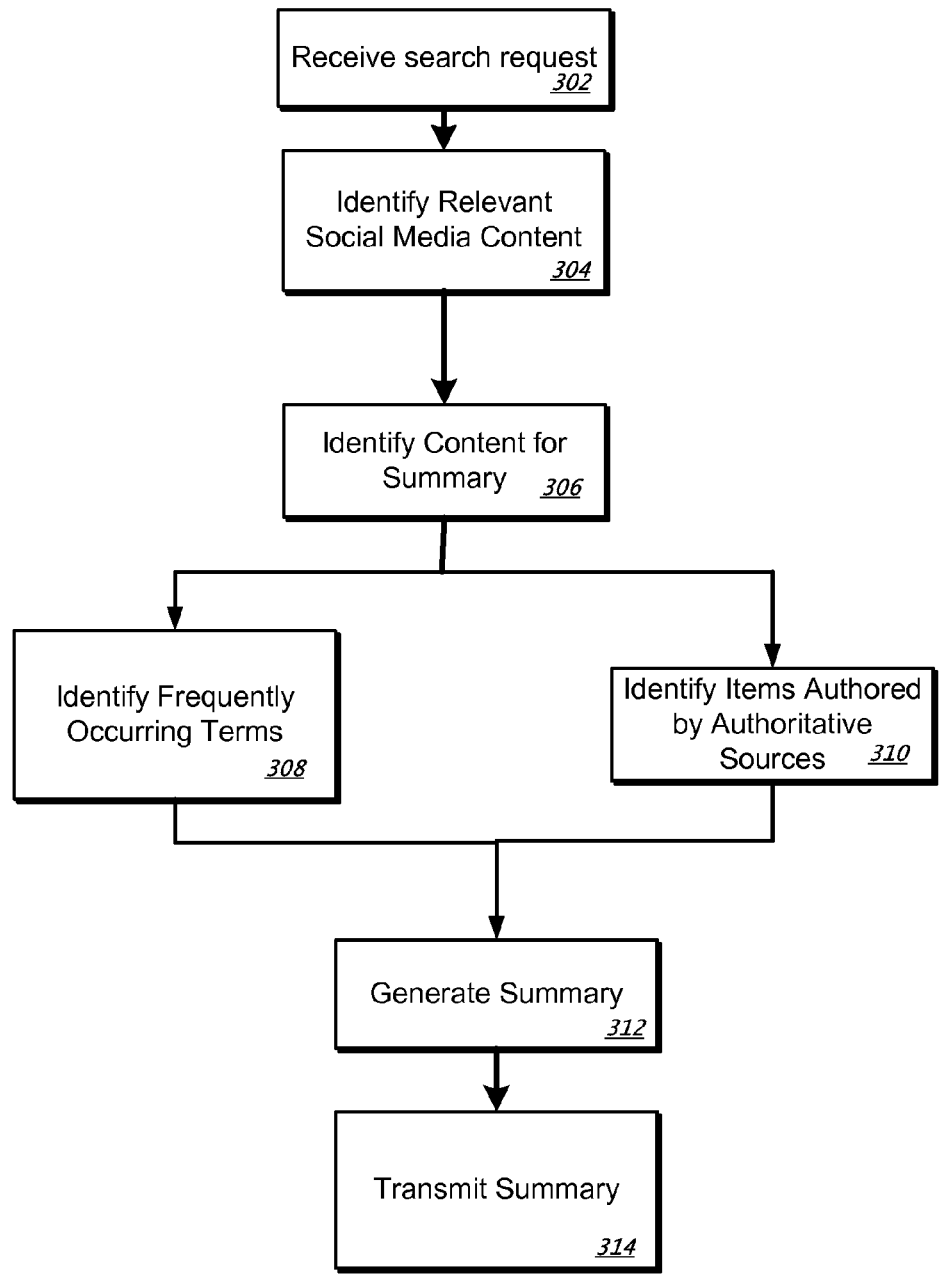
FIG. 3 is a flow chart of an example process for generating a summary of social media content.

FIG. 3 is a flow chart of an example process 300 for generating summary 112 of social media content 128. In FIG. 3, process 300 performed on server 106 (and/or by data engine 111).

In operation, search request 110 is received (302). For example, server 106 receives (302) search request 110 with search terms 123. In response, relevant social media content 129 is identified (304). For example, data engine 111 generates search query 132. Using search query 132, data engine 111 searches social media content 128. Based on the searching, data engine 111 identifies (304) relevant social media content 129, including, e.g., a portion of social media content 128 that is relevant to search terms 123.

Content for summary 112 is identified (306). In an example, data engine 111 may implement numerous techniques in identifying (306) content for summary 112. In an example, frequently occurring terms 130 are identified (308) and items of relevant social media content 129 authored by authoritative sources are identified (310). For example, data engine 111 identifies (308) frequently occurring terms 130. Data engine 111 may also identify (310) items of relevant social media content 129 that are authored by authoritative sources. In another example, data engine 111 may generate (not shown) qualification language to be included in summary 112.

In the example of FIG. 3, summary 112 is generated (312). For example, data engine 111 generates (312) summary 112. In this example, data engine 111 generates summary 112 by concatenating together the qualification language with one or more of frequently occurring terms 130. In another example, data engine 111 generates summary 112 based on the item of relevant social media content 129 authored by the authoritative source, the qualification language, and one or more of frequently occurring terms 130 (or any combination thereof).

Summary 112 is transmitted (314). For example, server 106 transmits (314) summary 112 to client device 104, e.g., for display in content stream 109 of graphical user interface 114 and as a response to search request 110. In another example, server 106 also transmits, to client device 104, items of relevant social media content 129, e.g., for display in content stream 109 of graphical user interface 114 and as a response to search request 110.

Example Social Graph

Figure 4:
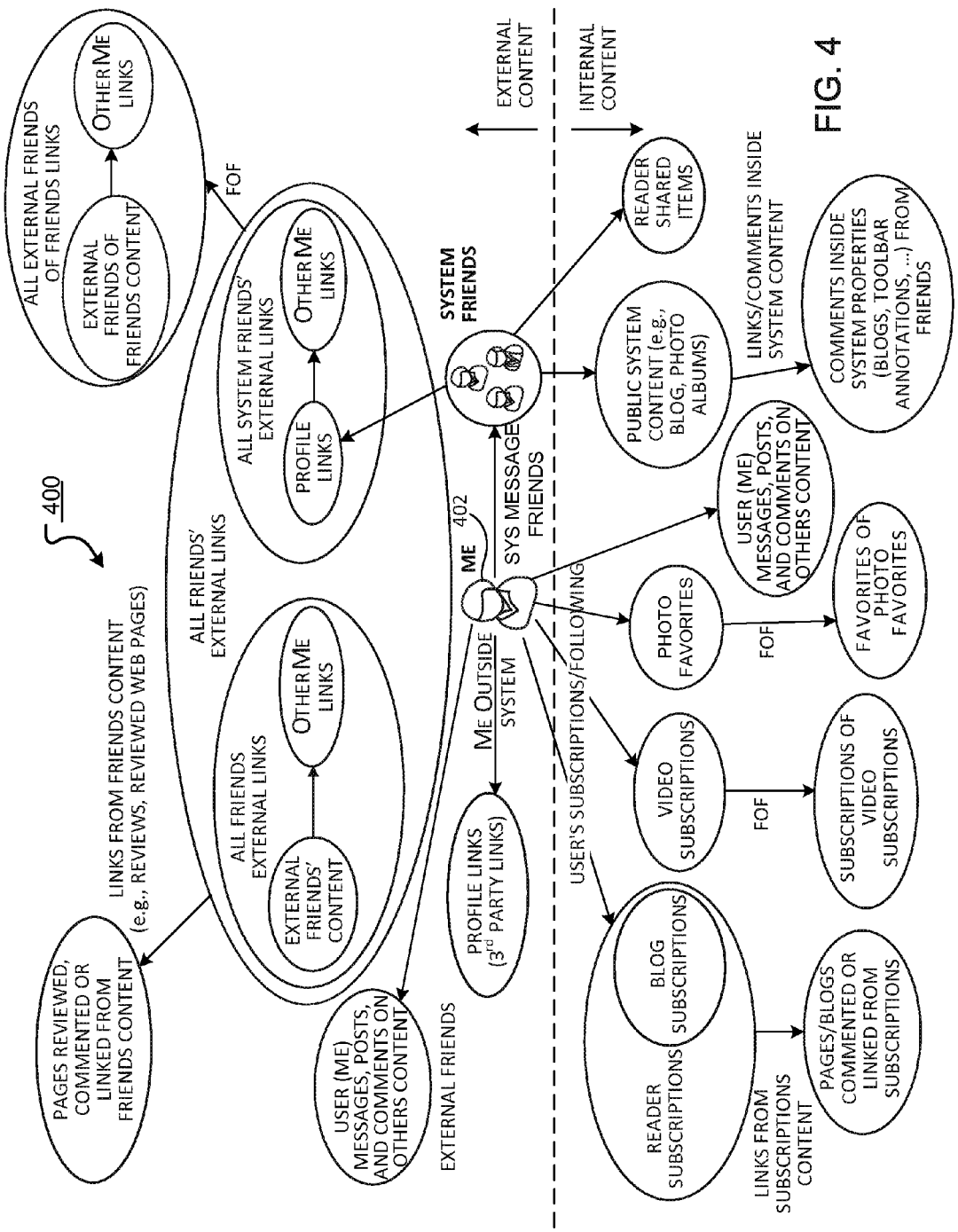
FIG. 4 is a conceptual view of an example social graph.

FIG. 4 is a conceptual view of an example social graph 400. Among other things, FIG. 4 shows sources of information for a social graph. In this example, the user's social graph is a collection of connections (e.g., users, resources/content, etc.) identified as having a relationship to the user 402 ("ME") within some degree of separation. The user's social graph may include parties and particular content at different degrees of separation. For example, the social graph of a user may include contacts, contacts of contacts (e.g., as defined by a user, social graphing site, or other metric), the user's social circle, people followed by the user (e.g., subscribed blogs, feeds, or Web sites), co-workers, and other specifically identified content of interest to the user (e.g., particular Web sites).

FIG. 4 shows that it is possible to extend the user's social graph to people and content both within a single network and across one or more external networks. For example, the user may have a profile or contacts list that includes a set of identified contacts, a set of interests, a set of links to external resources (e.g., Web pages), and subscriptions to content of a system (e.g., a system that provides various content and applications including electronic messages, chat, video, photo albums, feeds, or blogs). Likewise, blogs that include links to a user's contacts may be part of the user's social graph. These groups may be connected to other users or resources at another degree of separation from the user. For example, contacts of the user may have their own profiles that include connections to resources as well as contacts of the respective contacts, a set of interests, and so forth. In another example, a user may be connected to a social network account. That social network account may reference an article in a newspaper. A social connection, therefore, may be established between the user and the author of the article.

In some implementations, the connections to a user within a specified number of degrees of separation may be considered the bounds of the social graph of a user. Membership and degree of separation in the social graph may be based on other factors, including a frequency of interaction. For example, a frequency of interaction may be by the user (e.g., how often the user visits a particular social networking site) or it may be a type of interaction (e.g., endorsing, selecting, or not selecting items associated with contacts). As interactions change, the relationship of a particular contact in the social graph may also dynamically change. Thus, the social graph may be dynamic rather than static.

Social signals may be layered over the social graph (e.g., using weighted edges or other weights between connections in the social graph). These signals, for example, frequency of interaction or type of interaction between the user and a particular connection, may be used to weight particular connections in the social graph or social graphs without modifying the actual social graph connections. These weights may change as the interaction with the user changes.

Social graphs may be stored using suitable data structures (e.g., list or matrix type data structures). Information describing an aspect of a stored social graph may be considered relationship data. For example, relationship data may include information describing how particular members of a user's social graph are connected to a user (e.g., through what social path is a particular entity connected to the user). Relationship data may also include information describing social signals incorporated in the user's social graph. In some implementations, relationship data may be stored in a relationship lookup table (e.g., a hash table). Suitable keys for locating values (e.g., relationship data) within the lookup table may include information describing the identities of both a user and a member of the user's social graph. For example, a suitable key for locating relationship data within the lookup table may be (User X, User Y), where User Y is a member of User X's social graph.

Social graph information, including that described above, may be indexed for use in information retrieval. The social graph information may be part of a search index stored in data repository 108 (FIG. 1). Accordingly, the search index may be searched to identify relevant search results that are dependent upon social signals, e.g., that are associated with one or more aspects of a user's social graph, examples of which are provided above. For example, a search system may receive a query and identify, e.g., general search results and user-generated content. The user-generated content may include, e.g., search results based on the indexed social graph information (e.g., content from electronic messages, posts, blogs, chats, etc. of members of the searcher's social graph). The indexed social graph information may be updated intermittently or periodically, for example, to include recently added information associated with the user's social graph. The indexed social graph information may also be updated, e.g., on an on-going basis to reflect relationships determined in accordance with the processes described herein.

A user may prevent addition of members to the user's social graph, e.g., using an opt-out option or by keeping contacts out of particular groups used to generate the social graph. In some implementations, privacy features provide a user with an opt-in or opt-out option to allow or to prevent, respectively, being included (or removed the user if already included) as a member of another's social graph. Thus, users may have control over what personal information or connection information, if existing, is included in their social graphs and, consequently, that is included in the content streams and search results described herein.

Example Alternative System Implementations

Figure 5:
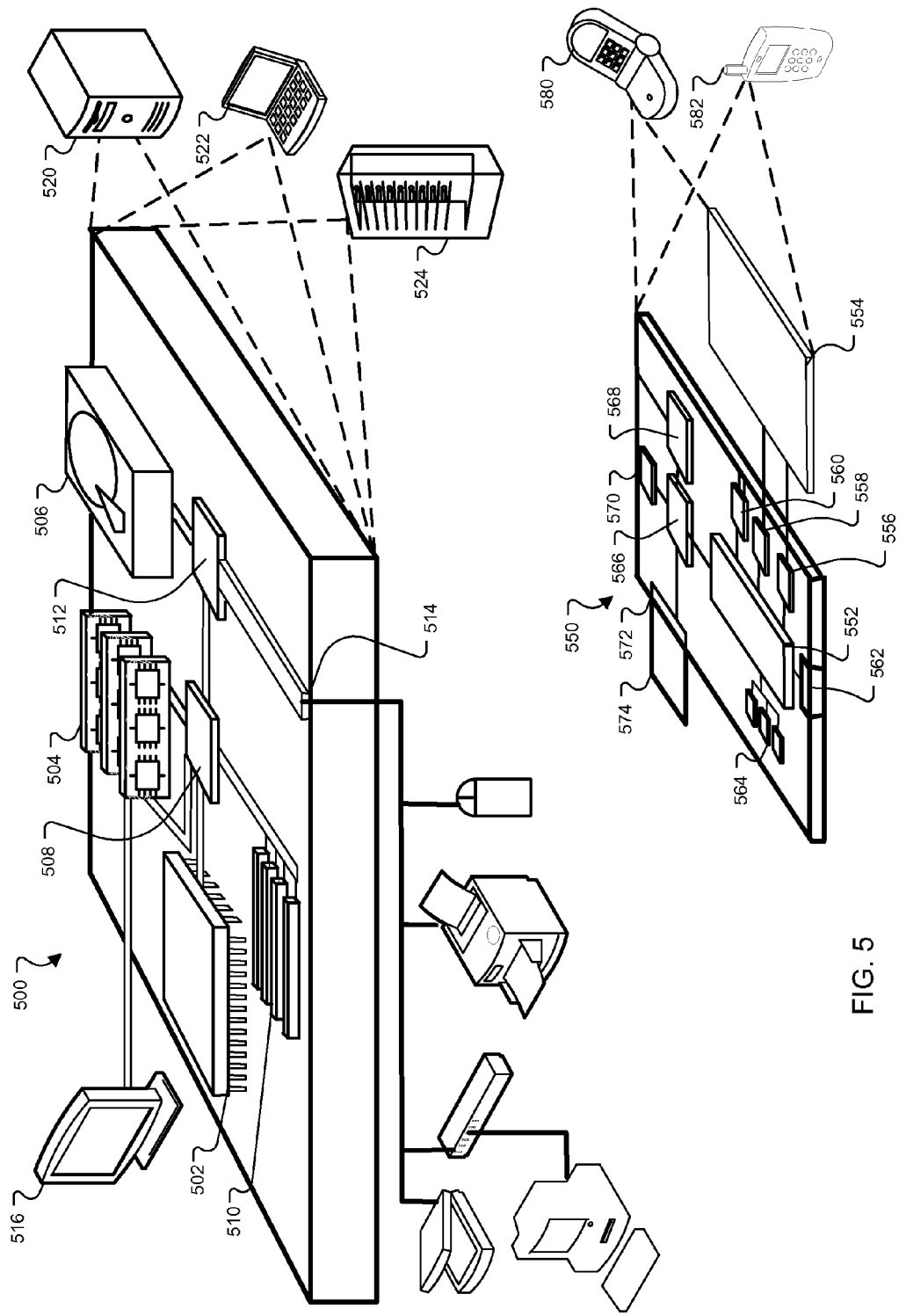
FIG. 5 shows an example of a computer device and a mobile computer device that can be used to implement the techniques described herein.

FIG. 5 shows an example of computer device 500 and mobile computer device 550, which can be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 500 includes processor 502, memory 504, storage device 506, high-speed interface 508 connecting to memory 504 and high-speed expansion ports 510, and low speed interface 512 connecting to low speed bus 514 and storage device 506. Each of components 502, 504, 506, 508, 510, and 512, are interconnected using various busses, and can be mounted on a common motherboard or in other manners as appropriate. Processor 502 can process instructions for execution within computing device 500, including instructions stored in memory 504 or on storage device 506 to display graphical data for a GUI on an external input/output device, such as display 516 coupled to high speed interface 508. In other implementations, multiple processors and/or multiple buses can be used, as appropriate, along with multiple memories and types of memory. Also, multiple computing devices 500 can be connected, with each device providing portions of the necessary operations (e.g., as a server bank, a group of blade servers, or a multi-processor system).

Memory 504 stores data within computing device 500. In one implementation, memory 504 is a volatile memory unit or units. In another implementation, memory 504 is a non-volatile memory unit or units. Memory 504 also can be another form of computer-readable medium, such as a magnetic or optical disk.

Storage device 506 is capable of providing mass storage for computing device 500. In one implementation, storage device 506 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in a data carrier.

The computer program product also can contain instructions that, when executed, perform one or more methods, such as those described above. The data carrier is a computer- or machine-readable medium, such as memory 504, storage device 506, memory on processor 502, and the like.

High-speed controller 508 manages bandwidth-intensive operations for computing device 500, while low speed controller 512 manages lower bandwidth-intensive operations. Such allocation of functions is an example only. In one implementation, high-speed controller 508 is coupled to memory 504, display 516 (e.g., through a graphics processor or accelerator), and to high-speed expansion ports 510, which can accept various expansion cards (not shown). In the implementation, low-speed controller 512 is coupled to storage device 506 and low-speed expansion port 514. The low-speed expansion port, which can include various communication ports (e.g., USB, Bluetooth®, Ethernet, wireless Ethernet), can be coupled to one or more input/output devices, such as a keyboard, a pointing device, a scanner, or a networking device such as a switch or router, e.g., through a network adapter.

Computing device 500 can be implemented in a number of different forms, as shown in the figure. For example, it can be implemented as standard server 520, or multiple times in a group of such servers. It also can be implemented as part of rack server system 524. In addition or as an alternative, it can be implemented in a personal computer such as laptop computer 522. In some examples, components from computing device 500 can be combined with other components in a mobile device (not shown), such as device 550. Each of such devices can contain one or more of computing device 500, 550, and an entire system can be made up of multiple computing devices 500, 550 communicating with each other.

Computing device 550 includes processor 552, memory 564, an input/output device such as display 554, communication interface 566, and transceiver 568, among other components. Device 550 also can be provided with a storage device, such as a microdrive or other device, to provide additional storage. Each of components 550, 552, 564, 554, 566, and 568, are interconnected using various buses, and several of the components can be mounted on a common motherboard or in other manners as appropriate.

Processor 552 can execute instructions within computing device 550, including instructions stored in memory 564. The processor can be implemented as a chipset of chips that include separate and multiple analog and digital processors. The processor can provide, for example, for coordination of the other components of device 550, such as control of user interfaces, applications run by device 550, and wireless communication by device 550.

Processor 552 can communicate with a user through control interface 558 and display interface 556 coupled to display 554. Display 554 can be, for example, a TFT LCD (Thin-Film-Transistor Liquid Crystal Display) or an OLED (Organic Light Emitting Diode) display, or other appropriate display technology. Display interface 556 can comprise appropriate circuitry for driving display 554 to present graphical and other data to a user. Control interface 558 can receive commands from a user and convert them for submission to processor 552. In addition, external interface 562 can communicate with processor 542, so as to enable near area communication of device 550 with other devices. External interface 562 can provide, for example, for wired communication in some implementations, or for wireless communication in other implementations, and multiple interfaces also can be used.

Memory 564 stores data within computing device 550. Memory 564 can be implemented as one or more of a computer-readable medium or media, a volatile memory unit or units, or a non-volatile memory unit or units. Expansion memory 574 also can be provided and connected to device 550 through expansion interface 572, which can include, for example, a SIMM (Single In Line Memory Module) card interface. Such expansion memory 574 can provide extra storage space for device 550, or also can store applications or other data for device 550. Specifically, expansion memory 574 can include instructions to carry out or supplement the processes described above, and can include secure data also. Thus, for example, expansion memory 574 can be provide as a security module for device 550, and can be programmed with instructions that permit secure use of device 550. In addition, secure applications can be provided via the SIMM cards, along with additional data, such as placing identifying data on the SIMM card in a non-hackable manner.

The memory can include, for example, flash memory and/or NVRAM memory, as discussed below. In one implementation, a computer program product is tangibly embodied in an data carrier. The computer program product contains instructions that, when executed, perform one or more methods, such as those described above. The data carrier is a computer- or machine-readable medium, such as memory 564, expansion memory 574, and/or memory on processor 552, that can be received, for example, over transceiver 568 or external interface 562.

Device 550 can communicate wirelessly through communication interface 566, which can include digital signal processing circuitry where necessary. Communication interface 566 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 568. In addition, short-range communication can occur, such as using a Bluetooth®, WiFi, or other such transceiver (not shown). In addition, GPS (Global Positioning System) receiver module 570 can provide additional navigation- and location-related wireless data to device 550, which can be used as appropriate by applications running on device 550.

Device 550 also can communicate audibly using audio codec 560, which can receive spoken data from a user and convert it to usable digital data. Audio codec 560 can likewise generate audible sound for a user, such as through a speaker, e.g., in a handset of device 550. Such sound can include sound from voice telephone calls, can include recorded sound (e.g., voice messages, music files, and the like) and also can include sound generated by applications operating on device 550.

Computing device 550 can be implemented in a number of different forms, as shown in the figure. For example, it can be implemented as cellular telephone 580. It also can be implemented as part of smartphone 582, personal digital assistant, or other similar mobile device.

Using the techniques described herein, a system in configured to generate a summary of social media content that is relevant to search terms in a search request. In an example, the summary includes a combination of frequently occurring terms (e.g., in the relevant social media content) and items of relevant social media content that have been authored by authoritative sources.

For situations in which the systems and techniques discussed herein collect personal information about users, the users may be provided with an opportunity to opt in/out of programs or features that may collect personal information (e.g., information about a user's preferences or a user's current location). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (e.g., to a city, zip code, or state level), so that a particular location of the user cannot be determined.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying data to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engines described herein can be separated, combined or incorporated into a single or combined engine. The engines depicted in the figures are not intended to limit the systems described here to the software architectures shown in the figures.

All processes described herein and variations thereof (referred to as "the processes") contain functionality to ensure that party privacy is protected. To this end, the processes may be programmed to confirm that a user's membership in a social networking account is publicly known before divulging, to another party, that the user is a member. Likewise, the processes may be programmed to confirm that information about a party is publicly known before divulging that information to another party, or even before incorporating that information into a social graph.

A number of embodiments have been described. Nevertheless, it will be understood that various modifications can be made without departing from the spirit and scope of the processes and techniques described herein. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A method comprising:
   receiving, by one or more processing devices from a client device of a user, one or more search terms specified by the user;
   searching, in a social network, for items of social media content that (i) are posted by one or more other users socially connected in the social network within one degree of separation to the user who specified the one or more search terms, and (ii) have at least a predefined amount of relevance to the one or more search terms;
   identifying, based on searching, a plurality of different items of social media content that (i) are posted by the one or more other users socially connected in the social network within one degree of separation to the user who specified the one or more search terms, and (ii) have at least the predefined amount of relevance to the one or more search terms;
   identifying, in the plurality of different items of social media content, one or more terms having at least the predefined amount of relevance to at least one of the one or more search terms;
   identifying one or more previously executed search queries that comprise at least one of the one or more terms identified;
   re-executing at least one of the one or more previously executed search queries;
   identifying, based on re-executing, one or more additional items of social media content that (i) are posted by the one or more other users socially connected in the social network within one degree of separation to the user who specified the one or more search terms, and (ii) have at least the predefined amount of relevance to the one or more search terms; and
   generating, by the one or more processing devices, a summary of (i) content of the plurality of different items of social media content identified based on searching, and (ii) content of the one or more additional items of social media content identified based on re-execution;
   wherein the summary provides a description of content in at least a subset of the one or more additional items of social media content and the plurality of different items of social media content that are posted by the one or more other users socially connected in the social network within one degree of separation to the user who specified the one or more search terms, and wherein the summary differs from the content in the subset of the plurality of different items of social media content.

2. The method of claim 1, wherein generating the summary comprises:
   identifying one or more terms that are occur with increased frequency in the plurality of different items of social media content identified, relative to a frequency with which other terms occur in the plurality of different items of social media content identified;
   wherein the summary comprises at least one of the one or more terms identified.

3. The method of claim 2, further comprising:
   generating information that qualifies the one or more terms identified;
   wherein the summary further comprises the information generated.

4. The method of claim 1, wherein generating the summary comprises:
   identifying, in the plurality of different items of social media content identified, an item of social media content authored by an authoritative source;
   wherein the summary comprises at least the item of social media content authored by the authoritative source.

5. The method of claim 1, further comprising:
   generating, based on the one or more search terms, a search query;
   wherein searching comprises:
   searching based on the search query.

6. The method of claim 5, further comprising:
   selecting one or more terms occurring in the plurality of different items of social media content associated with at least the predefined amount of relevance to the one or more search terms; and
   expanding the search query to include the one or more terms selected.

7. The method of claim 1, further comprising:
   transmitting, to the client device, the summary for display in a content stream rendered in a graphical user interface.

8. One or more machine-readable hardware storage devices storing instructions that are executable by one or more processing devices to perform operations comprising:
   receiving, from a client device of a user, one or more search terms specified by the user;
   searching, in a social network, for items of social media content that (i) are posted by one or more other users socially connected in the social network within one degree of separation to the user who specified the one or more search terms, and (ii) have at least a predefined amount of relevance to the one or more search terms;
   identifying, based on searching, a plurality of different items of social media content that (i) are posted by the one or more other users socially connected in the social network within one degree of separation to the user who specified the one or more search terms, and (ii) have at least the predefined amount of relevance to the one or more search terms;
   identifying, in the plurality of different items of social media content, one or more terms having at least the predefined amount of relevance to at least one of the one or more search terms;
   identifying one or more previously executed search queries that comprise at least one of the one or more terms identified;
   re-executing at least one of the one or more previously executed search queries;

identifying, based on re-executing, one or more additional items of social media content that (i) are posted by the one or more other users socially connected in the social network within one degree of separation to the user who specified the one or more search terms, and (ii) have at least the predefined amount of relevance to the one or more search terms; and generating a summary of (i) content of the plurality of different items of social media content identified based on searching, and (ii) content of the one or more additional items of social media content identified based on re-execution;

wherein the summary provides a description of content in at least a subset of the one or more additional items of social media content and the plurality of different items of social media content that are posted by the one or more other users socially connected in the social network within one degree of separation to the user who specified the one or more search terms, and wherein the summary differs from the content in the subset of the plurality of different items of social media content.

9. The one or more machine-readable hardware storage devices of claim 8, wherein generating the summary comprises:

identifying one or more terms that are occur with increased frequency in the plurality of different items of social media content identified, relative to a frequency with which other terms occur in the plurality of different items of social media content identified;

wherein the summary comprises at least one of the one or more terms identified.

10. The one or more machine-readable hardware storage devices of claim 9, wherein the operations further comprise:

generating information that qualifies the one or more terms identified;

wherein the summary further comprises the information generated.

11. The one or more machine-readable hardware storage devices of claim 8, wherein generating the summary comprises:

identifying, in the plurality of different items of social media content identified, an item of social media content authored by an authoritative source;

wherein the summary comprises at least the item of social media content authored by the authoritative source.

12. The one or more machine-readable hardware storage devices of claim 8, wherein the operations further comprise:

generating, based on the one or more search terms, a search query;

wherein searching comprises:

searching based on the search query.

13. The one or more machine-readable hardware storage devices of claim 12, wherein the operations further comprise:

selecting one or more terms occurring in the plurality of different items of social media content associated with at least the predefined amount of relevance to the one or more search terms; and expanding the search query to include the one or more terms selected.

14. The one or more machine-readable hardware storage devices of claim 8, wherein the operations further comprise:

transmitting, to the client device, the summary for display in a content stream rendered in a graphical user interface.

15. An electronic system comprising:

one or more processing devices; and one or more machine-readable hardware storage devices storing instructions that are executable by the one or more processing devices to perform operations comprising:

receiving, from a client device of a user, one or more search terms specified by the user;

searching, in a social network, for items of social media content that (i) are posted by one or more other users socially connected in the social network within one degree of separation to the user who specified the one or more search terms, and (ii) have at least a predefined amount of relevance to the one or more search terms;

identifying, based on searching, a plurality of different items of social media content that (i) are posted by the one or more other users socially connected in the social network within one degree of separation to the user who specified the one or more search terms, and (ii) have at least the predefined amount of relevance to the one or more search terms;

identifying, in the plurality of different items of social media content, one or more terms having at least the predefined amount of relevance to at least one of the one or more search terms;

identifying one or more previously executed search queries that comprise at least one of the one or more terms identified;

re-executing at least one of the one or more previously executed search queries;

identifying, based on re-executing, one or more additional items of social media content that (i) are posted by the one or more other users socially connected in the social network within one degree of separation to the user who specified the one or more search terms, and (ii) have at least the predefined amount of relevance to the one or more search terms; and generating a summary of (i) content of the plurality of different items of social media content identified based on searching, and (ii) content of the one or more additional items of social media content identified based on re-execution;

wherein the summary provides a description of content in at least a subset of the one or more additional items of social media content and the plurality of different items of social media content that are posted by the one or more other users socially connected in the social network within one degree of separation to the user who specified the one or more search terms, and wherein the summary differs from the content in the subset of the plurality of different items of social media content.

16. The electronic system of claim 15, wherein generating the summary comprises:

identifying one or more terms that are occur with increased frequency in the plurality of different items of social media content identified, relative to a frequency with which other terms occur in the plurality of different items of social media content identified;

wherein the summary comprises at least one of the one or more terms identified.

17. The electronic system of claim 16, wherein the operations further comprise:

generating information that qualifies the one or more terms identified;

wherein the summary further comprises the information generated.

18. The electronic system of claim 15, wherein generating the summary comprises:
- identifying, in the plurality of different items of social media content identified, an item of social media content authored by an authoritative source;
- wherein the summary comprises at least the item of social media content authored by the authoritative source.

19. The electronic system of claim 15, wherein the operations further comprise:
- generating, based on the one or more search terms, a search query;
- wherein searching comprises:
- searching based on the search query.

20. The electronic system of claim 19, wherein the operations further comprise:
- selecting one or more terms occurring in the plurality of different items of social media content associated with at least the predefined amount of relevance to the one or more search terms; and
- expanding the search query to include the one or more terms selected.

21. The electronic system of claim 15, wherein the operations further comprise:
- transmitting, to the client device, the summary for display in a content stream rendered in a graphical user interface.

22. An electronic system comprising:
- means for receiving, from a client device of a user, one or more search terms specified by the user;
- means for searching, in a social network, for items of social media content that (i) are posted by one or more other users socially connected in the social network within one degree of separation to the user who specified the one or more search terms, and (ii) have at least a predefined amount of relevance to the one or more search terms;
- means for identifying, based on searching, a plurality of different items of social media content that (i) are posted by the one or more other users socially connected in the social network within one degree of separation to the user who specified the one or more search terms, and (ii) have at least the predefined amount of relevance to the one or more search terms;
- means for identifying, in the plurality of different items of social media content, one or more terms having at least the predefined amount of relevance to at least one of the one or more search terms;
- means for identifying one or more previously executed search queries that comprise at least one of the one or more terms identified;
- means for re-executing at least one of the one or more previously executed search queries;
- means for identifying, based on re-executing, one or more additional items of social media content that (i) are posted by the one or more other users socially connected in the social network within one degree of separation to the user who specified the one or more search terms, and (ii) have at least the predefined amount of relevance to the one or more search terms; and
- means for generating a summary of (i) content of the plurality of different items of social media content identified based on searching, and (ii) content of the one or more additional items of social media content identified based on re-execution;
- wherein the summary provides a description of content in at least a subset of the one or more additional items of social media content and the plurality of different items of social media content that are posted by the one or more other users socially connected in the social network within one degree of separation to the user who specified the one or more search terms, and wherein the summary differs from the content in the subset of the plurality of different items of social media content.

* * * * *